US012807503B2

(12) United States Patent
Lee et al.

(10) Patent No.: US 12,807,503 B2
(45) Date of Patent: Nov. 24, 2026

(54) SILICA AEROGEL AND METHOD FOR PRODUCING SILICA AEROGEL BLANKET

(71) Applicant: LG CHEM, LTD., Seoul (KR)

(72) Inventors: Kyu Reon Lee, Daejeon (KR); Kyoung Shil Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 522 days.

(21) Appl. No.: 18/282,055

(22) PCT Filed: Jun. 7, 2022

(86) PCT No.: PCT/KR2022/008034

§ 371 (c)(1),
(2) Date: Sep. 14, 2023

(87) PCT Pub. No.: WO2022/260411

PCT Pub. Date: Dec. 15, 2022

(65) Prior Publication Data

US 2024/0166525 A1 May 23, 2024

(30) Foreign Application Priority Data

Jun. 8, 2021 (KR) ........................ 10-2021-0074292

(51) Int. Cl.
*C01B 33/154* (2006.01)
*C01B 33/158* (2006.01)

(52) U.S. Cl.
CPC ........ *C01B 33/154* (2013.01); *C01B 33/1585* (2013.01)

(58) Field of Classification Search
None
See application file for complete search history.

(56) References Cited

U.S. PATENT DOCUMENTS

| | | | |
|---|---|---|---|
| 2004/0158018 | A1 | 8/2004 | Kobayahi et al. |
| 2009/0306326 | A1 | 12/2009 | Magee et al. |
| 2011/0160429 | A1 | 6/2011 | Magee et al. |
| 2011/0184142 | A1 | 7/2011 | Magee et al. |
| 2011/0240907 | A1 | 10/2011 | Sharma et al. |
| 2017/0101321 | A1 | 4/2017 | Kugimiya et al. |
| 2018/0134565 | A1 | 5/2018 | Hindelang et al. |
| 2019/0330423 | A1 | 10/2019 | Lee et al. |
| 2020/0331766 | A1 | 10/2020 | Oh et al. |
| 2021/0206648 | A1 | 7/2021 | Kim et al. |
| 2021/0206923 | A1 | 7/2021 | Lee et al. |
| 2022/0064010 | A1 | 3/2022 | Oh et al. |
| 2022/0098046 | A1 | 3/2022 | Lee et al. |
| 2022/0250922 | A1 | 8/2022 | Jeon et al. |
| 2024/0228304 | A1 | 7/2024 | Lee et al. |

FOREIGN PATENT DOCUMENTS

| | | | | | |
|---|---|---|---|---|---|
| CN | 102317209 | A | | 1/2012 | |
| CN | 104556064 | A | * | 4/2015 | |
| CN | 105036142 | B | | 5/2017 | |
| CN | 112119037 | A | | 12/2020 | |
| CN | 112135860 | A | | 12/2020 | |
| EP | 3778712 | A1 | | 2/2021 | |
| JP | 2000-178020 | A | | 6/2000 | |
| JP | 2000160098 | A | | 6/2000 | |
| JP | 2003012803 | A | | 1/2003 | |
| JP | 2005118635 | A | | 5/2005 | |
| JP | 4369200 | B2 | | 11/2009 | |
| JP | 2014-501320 | A | | 1/2014 | |
| JP | 2015-189661 | A | | 11/2015 | |
| JP | 2019508548 | A | | 3/2019 | |
| KR | 10-1064869 | B1 | | 9/2011 | |
| KR | 10-2018-0056109 | A | | 5/2018 | |
| KR | 10-2019-0056818 | A | | 5/2019 | |
| KR | 10-2054846 | B1 | | 12/2019 | |
| KR | 10-2020-0062506 | A | | 6/2020 | |
| KR | 10-2021-0028082 | A | | 3/2021 | |
| KR | 20210038232 | A | | 4/2021 | |
| WO | WO-2020111765 | A1 | * | 6/2020 | ................ C08J 9/28 |
| WO | 2021066482 | A1 | | 4/2021 | |

OTHER PUBLICATIONS

English translation of CN-104556064-A Description. (Year: 2015).*

* cited by examiner

*Primary Examiner* — Richard M Rump
*Assistant Examiner* — Zachary John Baum
(74) *Attorney, Agent, or Firm* — Bryan Cave Leighton Paisner LLP

(57) ABSTRACT

Provided is a method for producing silica aerogel using a pre-hydrolyzed polysilicate, the method comprising: applying a polysilicate as a reactant when synthesizing of the pre-hydrolyzed polysilicate; and hydrating the polysilicate in the presence of an alcohol-based compound, which is generated through the hydration of a compound of Formula 1 without the addition of a separate alcohol-based solvent:

$$R_1\text{—}Si(OR_2)_3 \quad \text{[Formula 1]}$$

wherein $R_1$ is an alkyl having 1 to 20 carbon atoms, a cycloalkyl having 3 to 20 carbon atoms, or a vinyl having 1 to 20 carbon atoms, and each $R_2$ is independently an alkyl having 1 to 20 carbon atoms.

14 Claims, No Drawings

SILICA AEROGEL AND METHOD FOR PRODUCING SILICA AEROGEL BLANKET

CROSS-REFERENCE TO RELATED APPLICATIONS

This application is a National Stage Application of International Application No. PCT/KR2022/008034 filed on Jun. 7, 2022, which claims the benefit of Korean Patent Application No. 10-2021-0074292, filed on Jun. 8, 2021, in the Korean Intellectual Property Office, the disclosure of which is incorporated herein in its entirety by reference.

TECHNICAL FIELD

The present invention relates to a silica aerogel and a method for producing a silica aerogel blanket, wherein a pre-hydrolyzed polysilicate is prepared by a method that does not require a separate reaction solvent during a reaction, and the silica aerogel uses the pre-hydrolyzed polysilicate as a precursor.

BACKGROUND

An aerogel is a super-porous, high specific surface area (≥500 $m^2/g$) material having a porosity of about 90-99.9% and a pore size in the range of 1-100 nm, and is a material having excellent properties of ultra-light weight, super thermal insulation, ultra-low dielectric, and the like. Accordingly, research on the development of aerogel materials as well as research on the practical use thereof as environmentally friendly high-temperature thermal insulation materials, ultra-low dielectric thin films for highly integrated devices, catalysts and catalyst carriers, electrodes for supercapacitors, and electrode materials for seawater desalination have been actively conducted.

The biggest advantages of the aerogel are that the aerogel has super-insulation properties exhibiting a thermal conductivity of 0.300 W/m·K or less, which is lower than that of a conventional organic thermal insulation material such as Styrofoam, and that fire vulnerability and the generation of harmful gases in case of occurrence of fire which are fatal weaknesses of the organic thermal insulation material can be solved.

In general, the aerogel is produced by preparing a wet gel from a silica precursor such as water glass and an alkoxysilane group (TEOS, TMOS, MTMS, and the like) and removing a liquid component inside the wet gel without destroying the microstructure. A silica aerogel can be typically classified into three types, i.e., powder, granule, and monolith, and the silica aerogel is generally produced in the form of powder.

In particular, among the above silica precursors, tetra ethyl ortho silicate (TEOS) is a material which is used in a variety of industrial fields, such as in manufacturing for coating agents, insulation agents, and porous ceramic. In the market, various products such as pure TEOS, condensed TEOS, and pre-hydrolyzed TEOS (HTEOS) are being sold.

Among the above, HTEOS is an ethyl polysilicate oligomer with a broad molecular weight distribution. When the HTEOS is synthesized in the form of an oligomer from a TEOS monomer, physical properties such as gelation time can be adjusted, and thus, can be easily applied according to user's reaction conditions. In addition, there is an advantage in that reproducible physical properties of a final product can be created.

In general, the HTEOS is synthesized by performing a partial hydration reaction and a condensation reaction on an alkoxysilane-based monomer compound such as TEOS under acidic conditions. At this time, the condensation reaction is performed as a reflux reaction under acidic conditions, and since the rate of condensation is so slow, in order to achieve a desired degree of condensation, the condensation reaction must be performed for a long time. Accordingly, there are problems of high energy costs and the deterioration of process efficiency, and there is a problem in that the unit cost of raw materials of an alkoxysilane-based monomer compound such as TEOS which is used as a reactant is high, so that production costs are increased. Meanwhile, a condensation catalyst can be used to increase the condensation rate, but in this case, it is difficult to control the molecular weight of a reaction product, costs for purchasing a catalyst are generated, and a catalyst separation process should be added in a synthesis step, so that there are disadvantages in that processing becomes more complicated and production costs are increased.

Therefore, when compared to a typical production method using TEOS, a condensation reaction can be omitted by using a polysilicate rather than an alkoxysilane-based monomer compound such as TEOS as a reactant, so that a method for synthesizing a pre-hydrolyzed polysilicate has been proposed wherein a process is simple and production costs can be significantly reduced.

In a method of using a polysilicate as the reactant, a method of reacting the polysilicate with an acidic aqueous solution using ethanol as a solvent is used. The use of an amphipathic (amphiphilic) solvent such as ethanol is essentially required because layer separation occurs when an acidic aqueous solution is added to a polysilicate.

PRIOR ART DOCUMENT

Patent Document (Patent Document 1) Japanese Patent Application Publication No. 2014-501320 (Published on Jan. 20, 2014)

(Patent Document 2) Korean Patent Laid-open Publication No. 2020-0062506 (Jun. 4, 2020)

BRIEF DESCRIPTION

Technical Problem

An aspect of the present invention provides a method for producing silica aerogel by using a pre-hydrolyzed polysilicate, wherein a polysilicate is applied as a reactant for synthesizing the pre-hydrolyzed polysilicate, and the pre-hydrolyzed polysilicate is prepared by a method that does not require a separate reaction solvent during a reaction.

Another aspect of the present invention provides a method for producing a silica aerogel blanket by using a pre-hydrolyzed polysilicate, wherein the pre-hydrolyzed polysilicate is prepared by a method that does not require a separate reaction solvent during a reaction.

Technical Solution

According to an aspect of the present invention, provided is a method for producing silica aerogel.

(1) The present invention provides a method for producing silica aerogel, which comprises (Step 1) introducing a polysilicate and a compound of Formula 1 below into a reactor; (Step 2) introducing an acidic aqueous solution into the reactor to prepare a reaction mixture; (Step 3) stirring the reaction mixture to perform a hydration reaction, thereby preparing a pre-hydrolyzed polysilicate; (Step 4) adding a catalyst solution to the pre-hydrolyzed polysilicate, followed by mixing to prepare a silica sol; and (Step 5) gelling the silica sol to form a silica wet gel:

$$R_1—Si—(OR_2)_3 \quad \text{[Formula 1]}$$

wherein $R_1$ is an alkyl having 1 to 20 carbon atoms, a cycloalkyl having 3 to 20 carbon atoms, or a vinyl having 1 to 20 carbon atoms, and each $R_2$ independently is an alkyl having 1 to 20 carbon atoms.

(2) In (1) above, the present invention provides a method for producing silica aerogel, which further comprises (Step 6) aging the silica wet gel, after Step 5.

(3) In (1) or (2) above, the present invention provides a method for producing silica aerogel, which further comprises (Step 7) drying the silica wet gel.

(4) In (3) above, the present invention provides a method for producing silica aerogel, the method in which the drying is performed by supercritical drying and the method further including, after the supercritical drying, recycling waste liquid in preparing the catalyst solution used in Step 4 without a separate purification process.

(5) In any one of (1) to (4) above, the present invention provides a method for producing silica aerogel, the method in which the catalyst solution contains water, an alcohol compound, a basic catalyst, and an organosilane compound.

(6) In any of (1) to (5) above, the present invention provides a method for producing silica aerogel, the method in which the compound of Formula 1 above is hydrated to form an alcohol compound of Formula 2 below and a silanol compound of Formula 3 below:

$$R_2—OH \quad \text{[Formula 2]}$$

$$R_1—Si—(OH)_3 \quad \text{[Formula 3]}$$

wherein $R_1$ is an alkyl having 1 to 20 carbon atoms, a cycloalkyl having 3 to 20 carbon atoms, or a vinyl having 1 to 20 carbon atoms, and $R_2$ is alkyl having 1 to 20 carbon atoms.

(7) In any one of (1) to (6) above, the present invention provides a method for producing silica aerogel, the method in which the hydration of a polysilicate of Step 3 is performed in the presence of an alcohol compound of Formula 2 formed by hydration of a compound of Formula 1:

$$R_2—OH \quad \text{[Formula 2]}$$

wherein $R_2$ is an alkyl having 1 to 20 carbon atoms.

(8) In any one of (1) to (7) above, the present invention provides a method for producing silica aerogel, the method in which a molar ratio of the polysilicate to the compound of Formula 1 is 5:1 to 15:1.

(9) In any one of (1) to (8) above, the present invention provides a method for producing silica aerogel, the method in which the acidic aqueous solution includes an acid catalyst in an amount of 0.005 parts by weight to 0.20 parts by weight based on 100 parts by weight of the polysilicate.

(10) In any one of (1) to (9) above, the present invention provides a method for producing silica aerogel, the method in which preparing a pre-hydrolyzed polysilicate does not require the introduction of a separate alcohol-based solvent in addition to the polysilicate and the compound of Formula 1 into the reactor.

(10) In any one of (1) to (10) above, the present invention provides a method for producing silica aerogel, the method in which the polysilicate includes one or more selected from the group consisting of methyl polysilicate, ethyl polysilicate, propyl polysilicate, isopropyl polysilicate, butyl polysilicate, secondary butyl polysilicate, tertiary butyl polysilicate, hexyl polysilicate, cyclohexyl polysilicate, and dodecyl polysilicate.

(12) In any one of (1) to (11) above, the present invention provides a method for producing silica aerogel, the method in which the compound of Formula 1 includes one or more selected from the group consisting of alkyltriethoxysilane and alkyltrimethoxysilane.

(13) In any one of (1) to (12) above, the present invention provides a method for producing silica aerogel, the method in which the compound of Formula 1 is methyltriethoxysilane.

(14) In any one of (1) to (13) above, the present invention provides a method for producing silica aerogel, the method in which the compound of Formula 1 is an alkyltriethoxysilane, and the alkyltriethoxysilane is hydrated to form an alkylsilanol and ethanol, and the hydration of the polysilicate in Step 3 is achieved in the presence of the ethanol formed by hydration of the alkyltriethoxysilane.

According to another aspect of the present invention, provided is a method for producing a silica aerogel blanket.

(15) The present invention provides a method for producing a silica aerogel blanket, which comprises Step 1) introducing a polysilicate and a compound of Formula 1 below into a reactor; (Step 2) introducing an acidic aqueous solution into the reactor to prepare a reaction mixture; (Step 3) stirring the reaction mixture to perform a hydration reaction, thereby preparing a pre-hydrolyzed polysilicate; (Step 4) adding a catalyst solution to the pre-hydrolyzed polysilicate, followed by mixing to prepare a silica sol; and (Step 5) impregnating a substrate for a blanket with the silica sol then gelling the silica sol to form a silica wet gel blanket:

$$R_1—Si—(OR_2)_3 \quad \text{[Formula 1]}$$

wherein $R_1$ is an alkyl having 1 to 20 carbon atoms, a cycloalkyl having 3 to 20 carbon atoms, or a vinyl having 1 to 20 carbon atoms, and each $R_2$ independently is an alkyl having 1 to 20 carbon atoms.

Advantageous Effects

A method for producing silica aerogel and a method for producing a silica aerogel blanket according to the present invention can omit a condensation reaction by applying a polysilicate as a reactant for synthesizing a pre-hydrolyzed polysilicate, thereby significantly shortening synthesis time and reducing production costs, unlike a production method in which an alkoxysilane-based monomer compound is used as a reactant, and additionally, a separate reaction solvent is not required in the hydration reaction of the polysilicate, so that it is possible to recycle a supercritical drying waste liquid generated when producing the silica aerogel and the silica aerogel blanket without a purification process therefor.

DETAILED DESCRIPTION

Hereinafter, the present invention will be described in more detail to facilitate understanding of the present invention. At this time, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor can properly define the meaning of the words or terms to best explain the invention.

A method for producing silica aerogel according to an embodiment of the present invention comprises (Step 1) introducing a polysilicate and a compound of Formula 1 below into a reactor; (Step 2) introducing an acidic aqueous solution into the reactor to prepare a reaction mixture; (Step 3) stirring the reaction mixture to perform a hydration reaction, thereby preparing a pre-hydrolyzed polysilicate; (Step 4) adding a catalyst solution to the pre-hydrolyzed polysilicate, followed by mixing to prepare a silica sol; and (Step 5) gelling the silica sol to form a silica wet gel:

$$R_1—Si(OR_2)_3 \quad \text{[Formula 1]}$$

wherein $R_1$ is an alkyl having 1 to 20 carbon atoms, a cycloalkyl having 3 to 20 carbon atoms, or a vinyl having 1 to 20 carbon atoms, and each $R_2$ independently is an alkyl having 1 to 20 carbon atoms.

In general, when a monomer compound such as a pre-hydrolyzed TEOS is used as a silica precursor which is used in the production of silica aerogel or a silica aerogel blanket, it is difficult to control the molecular weight or gelation reaction time of a final product and stability is deteriorated. Therefore, a pre-hydrolyzed polysilicate oligomer having a molecular weight of about 1000 is prepared and used. This is because, unlike a monomer such as TEOS, when a material in the form of an oligomer is used, stability can be ensured even if the degree of hydration is increased to control gelation reaction time. However, in a typical process of synthesizing the pre-hydrolyzed polysilicate, an alkoxysilane-based monomer compound such as a TEOS monomer is used as a reactant, so that a condensation reaction must be performed after partial hydration. At this time, the condensation reaction is performed as a reflux reaction under acidic conditions, and since the rate of condensation is so slow, in order to achieve a desired degree of condensation, the condensation reaction must be performed for a long time. Accordingly, there are problems of high energy costs and the deterioration of process efficiency, and there is a problem in that the unit cost of raw materials of an alkoxysilane-based monomer compound such as TEOS which is used as a reactant is high, so that production costs are increased. Meanwhile, a condensation catalyst can be used to increase the condensation rate, but in this case, it is difficult to control the molecular weight of a reaction product, costs for purchasing a catalyst are generated, and a catalyst separation process should be added in a synthesis step, so that there are problems in that processing becomes more complicated and production costs are increased.

However, in the method for producing silica aerogel of the present invention, in a process of preparing a pre-hydrolyzed polysilicate, only a step of partial hydration is included by using a polysilicate instead of an alkoxysilane-based monomer compound such as TEOS as a reactant, a condensation reaction is omitted to increase synthesis processing efficiency, and raw material costs are relatively low so that an economic effect can be obtained in terms of production cost, and by using a method in which the control of gelation reaction time and a weight average molecular weight is facilitated through the control of the content of an acid catalyst and the pH of the acid catalyst, it is possible to synthesize a pre-hydrolyzed polysilicate having excellent storage stability. In addition, the method for producing silica aerogel of the present invention does not require a separate reaction solvent during a hydration reaction of a pre-hydrolyzed polysilicate, and thus, can be usefully used when a reaction must be performed under conditions in which the use of a solvent is not desired, or when a highly-concentrated pre-hydrolyzed polysilicate is desired to be obtained, and since a separate alcohol solvent is not required in a production process of a hydrated polysilicate, which is a silica precursor, when supercritical waste liquid generated in a supercritical drying step in a silica aerogel or silica aerogel blanket production process is recycled, the supercritical waste liquid can be recycled in a process to prepare a catalyst solution without a separate purification process, and thus, can be easily recycled during a production process of a silica sol.

Hereinafter, each step of the method for producing silica aerogel according to an embodiment of the present invention will be described in detail.

Step 1)

Step 1) of the present invention is a step of introducing a polysilicate, which is a reactant, and a compound of Formula 1 into a reactor:

$$R_1—Si—(OR_2)_3 \quad \text{[Formula 1]}$$

wherein $R_1$ is an alkyl having 1 to 20 carbon atoms, a cycloalkyl having 3 to 20 carbon atoms, or a vinyl having 1 to 20 carbon atoms, and each $R_2$ independently is an alkyl having 1 to 20 carbon atoms.

In an embodiment of the present invention, $R_1$ can specifically be an alkyl having 1 to 12 carbon atoms, a cycloalkyl having 3 to 12 carbon atoms, or a vinyl having 1 to 12 carbon atoms, and can more specifically be an alkyl having 1 to 6 carbon atoms, or an alkyl having 1 to 4 carbon atoms, and each $R_2$ can specifically be independently an alkyl having 1 to 12 carbon atoms, and can more specifically be an alkyl having 1 to 6 carbon atoms, or an alkyl having 1 to 5 carbon atoms.

In addition, in an embodiment of the present invention, $R_1$ can be alkyl having 1 to 4 carbon atoms, and $R_2$ can be ethyl.

The present invention can omit a condensation reaction in a process of synthesizing a pre-hydrolyzed polysilicate by using a polysilicate as a reactant, and can exhibit a better silica production yield per unit content than when an alkoxysilane-based monomer compound is used as a reactant.

The polysilicate according to an embodiment of the present invention can have a silica ($SiO_2$) production yield of 30 wt % or higher, and specifically, can have a silica production yield of 30 to 45 wt %. Here, the silica ($SiO_2$) production yield is a value represented as a ratio of the content of silica which can be produced from 100 wt % of polysilicate. A material having a high silica production yield has a large amount of silica which can be produced at the same content, and when the silica production yield is high, a relatively small amount of raw materials can be used to obtain a silica precursor containing a desired content degree of silica, so that there is an effect of reducing the cost of raw materials.

A polysilicate which can be used in the present invention is not limited as long as it is polysilicate capable of forming a pre-hydrolyzed polysilicate which can be used as a silica precursor of a silica aerogel or an aerogel blanket through a partial hydration reaction. Specifically, alkyl polysilicate can be used, and more specifically, one or more selected from the group consisting of methyl polysilicate, ethyl polysilicate, propyl polysilicate, isopropyl polysilicate, butyl polysilicate, secondary butyl polysilicate, tertiary butyl polysilicate, hexyl polysilicate, cyclohexyl polysilicate, and dodecyl polysilicate can be included.

Also, according to an embodiment of the present invention, the polysilicate can have an average degree of polymerization of 3 to 30, specifically 5 to 15, more specifically 5 to 12. Specifically, the polysilicate can be an oligomer having the above degrees of polymerization. When the polysilicate satisfies the above average degree of polymerization, storage stability and fluidity are ensured so that ease of use is excellent. At this time, the average degree of polymerization was measured using Gel Permeation Chromatography (GPC) (Waters 2489 UV-vis Detector).

The compound of Formula 1 can be hydrated by water of an acidic aqueous solution introduced into the reactor in the following Step 2) to form an alcohol compound of Formula 2 below and a silanol compound of Formula 3 below, and the alcohol compound of Formula 2 acts as an amphiphilic (amphiphilic) solvent used for the hydration of a polysilicate in the following Step 3:

$R_2$—OH [Formula 2]

$R_1$—Si—$(OH)_3$ [Formula 3]

wherein $R_1$ is an alkyl having 1 to 6 carbon atoms, a cycloalkyl having 3 to 6 carbon atoms, or a vinyl having 1 to 6 carbon atoms, and $R_2$ is an alkyl having 1 to 6 carbon atoms, wherein specific examples of $R_1$ and $R_2$ are the same as defined in Formula 1 above.

According to an embodiment of the present invention, in Step 1), the input amount of the compound of Formula 1 can be changed and the input amount of the compound of Formula 1 can be determined according to the amount of an alcohol solvent required for the reaction, and the content of silica ($SiO_2$) included in a pre-hydrolyzed polysilicate finally produced.

The polysilicate and the compound of Formula 1 can have a Si molar ratio of 5:1 to 15:1, and can be used in a molar ratio of 6:1 to 15:1 when considering the concentration of a hydrated polysilicate obtained as a final product, and the content of silica ($SiO_2$) included in a pre-hydrolyzed polysilicate finally produced. In addition, the polysilicate and the compound of Formula 1 can specifically have a Si molar ratio of 7:1 to 14:1, 8:1 to 13:1, and more specifically, can have a Si molar ratio of 8:1 to 12:1. The Si molar ratio means a ratio of the number of moles of Si contained in the polysilicate and the number of moles of Si contained in the compound of Formula 1. When the Si content of the compound of Formula 1 compared to the Si content of the polysilicate is too small, an amount of alcohol formed by hydration of the compound of Formula 1 is small, so that the amount of alcohol can be insufficient to allow the polysilicate to be properly hydrated, and when the Si content of the compound of Formula 1 is excessive compared to the Si content included in the polysilicate, the amount of alcohol formed by the hydration of the compound of Formula 1 is excessive, so that the concentration of a hydrated polysilicate obtained as a final product can be lowered. In addition, when the polysilicate and the compound of Formula 1 satisfy the above Si molar ratio range, the degree of hydration of a synthesized pre-hydrolyzed polysilicate can have a suitable range.

The alcohol compound of Formula 2 generated above is not limited in its type as long as it is an alcohol known to be available to be used when preparing a pre-hydrolyzed polysilicate, and can specifically be an alcohol having 1 to 20 carbon atoms, more specifically an alcohol having 1 to 12 carbon atoms, an alcohol having 1 to 6 carbon atoms, or an alcohol having 1 to 5 carbon atoms.

Step 2)

Step 2) according to an embodiment of the present invention is a step of preparing a reaction mixture for partial hydration, and is a step in which the reaction mixture is prepared by introducing an acidic aqueous solution to a reactor including the reactant and stirring.

Also, the reaction mixture prepared in Step 2) can include water in an amount of 2 parts by weight to 42 parts by weight, specifically 3 parts by weight to 30 parts by weight, and more specifically 3 parts by weight to 20 parts by weight based on 100 parts by weight of polysilicate.

Here, the acidic aqueous solution is a mixed solution containing an acid catalyst and water, and the water contained in the acidic aqueous solution preferentially hydrates the compound of Formula 1 introduced in Step 1 to form an alcohol compound of Formula 2 and a silanol compound of Formula 3 as described above, and the polysilicate is further hydrated by using the formed alcohol compound of Formula 2 as an amphiphilic solvent.

The amount of the water and the acid catalyst contained in the acidic aqueous solution, and the pH of the acidic aqueous solution can be adjusted to control the degree of hydration of the polysilicate, and since the degree of hydration of the polysilicate is controlled, the gelation time and pH of a pre-hydrolyzed polysilicate finally produced can be adjusted.

The acidic aqueous solution can include an acid catalyst in an amount of 0.005 parts by weight to 0.20 parts by weight based on 100 parts by weight of polysilicate which is a reactant, and specifically, can include 0.008 to 0.10 parts by weight, more specifically, 0.010 to 0.090 parts by weight.

In the present invention, the content of acid catalyst included in an acidic aqueous solution is the same as the content of acid catalyst in the entire reaction mixture, and as the above content of acid catalyst is satisfied, the hydration rate during a hydration reaction to be described later can be improved to further improve the efficiency of the hydration reaction, and accordingly, the gelation reactivity of a synthesized pre-hydrolyzed polysilicate can also be improved. Also, the condensation reaction of the pre-hydrolyzed polysilicate itself can be suppressed to secure excellent storage stability, and a problem of corrosion due to excess acid catalyst can be prevented.

The acid catalyst according to an embodiment of the present invention is not particularly limited. However, the acid catalyst can be one or more selected from the group consisting of hydrochloric acid, nitric acid, acetic acid, sulfuric acid, and hydrofluoric acid, and can preferably be hydrochloric acid.

In addition, the acidic aqueous solution according to an embodiment of the present can be an acidic aqueous solution having a pH of 0.5 to 2.5, or having a pH of 1.0 to 2.5 in terms of synthesizing a pre-hydrolyzed polysilicate having an optimal degree of hydration and gelation reactivity. When the above pH range is satisfied, it is possible to produce a pre-hydrolyzed polysilicate having an optimal pH and gelation time.

Also, the reaction mixture prepared in Step 2) can include water in an amount of 2 parts by weight to 42 parts by weight, specifically 3 parts by weight to 30 parts by weight, and more specifically 3 parts by weight to 20 parts by weight, based on 100 parts by weight of the polysilicate. When the water is included in an amount less than 3 parts by weight, the water is included in too small an amount compared to the amount of polysilicate, so that a desired degree of hydration cannot be achieved during a hydration reaction, and when a pre-hydrolyzed polysilicate having a low degree of hydration is applied as a silica precursor in an aerogel production process, the ratio of a hydroxyl group (—OH) for inducing gelation is low, so that a gelation reaction may not be smoothly performed. Also, when the water is excessive, the degree of hydration of a finally produced pre-hydrolyzed polysilicate becomes too high, so that an alkoxy functional group of a silica precursor is mostly substituted with a hydroxyl group. Therefore, a gelation reaction can be performed in a process of storing and keeping, and viscosity can be easily increased so that storage stability and processability can be degraded.

In addition, in step 2), the content of the water and acid catalyst in the reaction mixture and the pH of the acidic aqueous solution can be controlled to control the degree of hydration, so that an unwanted gelation reaction can be prevented from occurring in the process of storing and keeping to secure excellent storage stability, and since the gelation time of a pre-hydrolyzed polysilicate can be controlled according to the above variable, desired gelation time can be obtained when a gelation reaction is induced.

Step 3)

Step 3) according to an embodiment of the present invention is a step for performing a hydration reaction by stirring the prepared reaction mixture, and is a step for forming a pre-hydrolyzed polysilicate in a partially hydrated state.

Specifically, in Step 3) of the present invention, a hydration reaction can be performed by stirring a reaction mixture. As described above, the hydration of the polysilicate in Step 3) is achieved in the presence of the alcohol compound of Formula 2 formed by the hydration of the compound of Formula 1, and therefore, in Step 3) according to an embodiment of the present invention, in the presence of an acid catalyst of the aqueous acid solution, hydration with the compound of Formula 1 is preferentially performed.

[Reaction Formula 1]

$$R_1—Si—(OR_2)_3 + 3(H_2O) \xrightarrow{\text{acid}} R_1—Si—(OH)_3 + 3(R_2—OH)$$

When only an acidic aqueous solution is added to a polysilicate, layer separation occurs between the polysilicate and the acidic aqueous solution and there is no reactivity. In order for a reaction to occur between the polysilicate and the acidic aqueous solution, the presence of an amphiphilic solvent such as an alcohol is essential. Since the amphiphilic solvent such as an alcohol remains in a final product, a pre-hydrolyzed polysilicate, which is the final product, is obtained in a form diluted in the amphiphilic solvent.

In Step 3) according to an embodiment of the present invention, a hydration reaction of the compound of Formula 1 is preferentially performed by stirring a reaction mixture, and the alcohol compound of Formula 2 is formed thereby, so that the alcohol compound of Formula 2 can act as an amphiphilic solvent between the polysilicate and the aqueous acid solution to perform a hydration reaction of the polysilicate. In addition, for example, as shown in Reaction Formula 2 below, the hydration reaction of the polysilicate can proceed more easily by the alcohol generated by the performance of the hydration reaction of the polysilicate. Therefore, the present invention may not require the addition of a separate amphiphilic solvent, such as an alcohol-based solvent, for the hydration reaction of the polysilicate in addition to the compound of Formula 1. Therefore, the present invention does not require a separate alcohol-based solvent for the hydration reaction of the polysilicate, and thus, can obtain a highly concentrated pre-hydrolyzed polysilicate as a final product.

[Reaction Formula 2]

$$Si_5O_4(OEt)_{12} + n\,H_2O \xrightarrow[\text{acid}]{R_2—OH,} Si_5O_4(OEt)_{12-n}(OH)_n + n\,EtOH$$

In an embodiment of the present invention, the compound of Formula 1 can include one or more selected from the group consisting of, for example, alkyltriethoxysilane and alkyltrimethoxysilane, and specifically, can be alkyltriethoxysilane, and more specifically, the compound of Formula 1 can be methyltriethoxysilane.

In an embodiment of the present invention, when the compound of Formula 1 is alkyltriethoxysilane, the alkyltriethoxysilane is hydrated by the acid aqueous solution introduced in Step 2 above to form alkylsilanol and ethanol, and the hydration of the polysilicate in Step 3 can be achieved in the presence of the ethanol formed by hydration of the alkyltriethoxysilane.

Step 3) according to an embodiment of the present invention can perform a partial hydration reaction by performing stirring for 30 minutes to 2 hours at room temperature, specifically under the condition of 15 to 25 °C. In the present invention, a polysilicate is used as a reactant, so that only by performing the above hydration reaction of Step 3), it is possible to synthesize a pre-hydrolyzed polysilicate, and since there is no need to perform a condensation reaction, which is essentially necessary when synthesizing a pre-hydrolyzed polysilicate by using a typical alkoxysilane-based monomer compound as a reactant, there are effects in that a synthesis process becomes simple and relatively low energy costs are required.

The pre-hydrolyzed polysilicate prepared as described above can exhibit excellent viscosity properties, storage stability, and processability. In addition, the pre-hydrolyzed polysilicate can specifically be a pre-hydrolyzed alkyl polysilicate, and more preferably, can be a pre-hydrolyzed ethyl polysilicate (HTESOL) which has the most excellent utilization as a silica precursor when manufacturing a silica aerogel or a silica aerogel blanket.

In the present invention, a pre-hydrolyzed polysilicate can mean a polysilicate which has been partially hydrated, and specifically, can mean a polysilicate in the state in which some alkoxy functional groups of the polysilicate are substituted with hydroxyl groups.

Step 4)

Step 4) according to an embodiment of the present invention is a step of adding a catalyst solution to the pre-hydrolyzed polysilicate, followed by mixing to prepare a silica sol.

The catalyst solution can include water, an alcohol compound, a basic catalyst, and an organosilane compound.

In an embodiment of the present invention, the alcohol compound is not limited in its type as long as it is an alcohol known to be available to be used in producing aerogel, and can specifically be an alcohol having 1 to 20 carbon atoms, more specifically an alcohol having 1 to 12 carbon atoms, an alcohol having 1 to 6 carbon atoms, or an alcohol having 1 to 5 carbon atoms.

In an embodiment of the present invention, the basic catalyst serves to promote gelation by increasing the pH of the silica sol.

The basic catalyst which can be used in the silica sol according to an embodiment of the present invention can be an inorganic base such as sodium hydroxide and potassium hydroxide, or an organic base such as ammonium hydroxide. Specifically, the basic catalyst can be one or more selected from the group consisting of sodium hydroxide (NaOH), potassium hydroxide (KOH), calcium hydroxide ($Ca(OH)_2$), ammonia ($NH_3$), ammonium hydroxide ($NH_4OH$), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethyl amino) ethanol, 2-(methyl amino) ethanol, N-methyl diethanolamine, dimethylaminoethanol, diethylaminoethanol, nitrilotriethanol, 2-(2-aminoethoxy) ethanol, 1-amino-2-propanol, triethanolamine, monopropanolamine, dibutanolamine, and pyridine, preferably sodium hydroxide, ammonia, ammonium hydroxide or a mixture thereof.

The basic catalyst can be included in an amount such that the pH of the silica sol is 4 to 8. When the basic catalyst is added such that the pH of the silica sol satisfies the above range, an optimal gelation rate can be obtained. In addition, since the base can be precipitated when added in a solid phase, it can be preferable that the base is added in the form of a solution diluted with the above alcohol (polar organic solvent). At this time, the dilution ratio of the base catalyst and alcohol can be 1:4 to 1:100 based on volume.

The organosilane compound can be included as a surface modifier for hydrophobizing aerogel and an aerogel blanket. The dried silica aerogel maintains a low thermal conductivity rate just after drying, however, absorbs water in the air due to a hydrophilic silanol group (Si—OH) present on the surface of silica, so that there is a disadvantage in that the thermal conductivity is gradually increased. Therefore, in order to maintain low thermal conductivity, there is a need to modify the surface of the silica aerogel to be hydrophobic. Therefore, in the method for producing a silica aerogel according to an embodiment of the present invention, the surface of the silica aerogel can be hydrophobized by the organosilane compound.

The organosilane compound can be one selected from the group consisting of trimethylchlorosilane (TMCS), hexamethyldisilazane (HMDS), methyltrimethoxysilane, trimethylethoxysilane, ethyltriethoxysilane, and phenyltriethoxysilane, and specifically, can be trimethylethoxysilane.

The organosilane compound can be included in an amount of 20 parts by weight to 60 parts by weight, specifically 30 parts by weight to 55 parts by weight, and more specifically 40 parts by weight to 50 parts by weight, based on 100 parts by weight of the pre-hydrolyzed polysilicate. When the amount of the organosilane compound is too small compared to the amount of the pre-hydrolyzed polysilicate, the reaction time can be too long and the surface modification efficiency can be reduced, and when the amount of the organosilane compound is too large compared to the amount of the pre-hydrolyzed polysilicate, there is a problem of an increase in cost.

Step 5)

Step 5 according to an embodiment of the present invention is a step of gelling the silica sol to form a silica wet gel.

The gelation performed in Step 5) of the present invention can form a network structure from a silica precursor material, wherein the network structure represents a planar mesh structure in which specific polygons having one or more types of atomic arrangement are linked to each other, or a structure in which specific polyhedrons share their vertices, edges, faces, and the like with each other to form a three-dimensional skeleton structure.

The gelation according to an embodiment of the present invention can be performed under the condition in which the pH is 3 to 10, preferably the pH is 4 to 8 in terms of ensuring an optimal gelation rate.

In addition, the present invention provides a method for producing a silica aerogel blanket, the method including (Step 1) introducing a polysilicate and a compound represented by Formula 1 below into a reactor; (Step 2) introducing an acidic aqueous solution into the reactor to prepare a reaction mixture; (Step 3) stirring the reaction mixture to perform a hydration reaction, thereby preparing a pre-hydrolyzed polysilicate; (Step 4) adding a catalyst solution to the pre-hydrolyzed polysilicate, followed by mixing to prepare a silica sol; and (Step 5) impregnating a substrate for a blanket with the silica sol then gelling the silica sol to form a silica wet gel blanket:

$$R_1—Si—(OR_2)_3 \qquad \text{[Formula 1]}$$

wherein $R_1$ is an alkyl having 1 to 20 carbon atoms, a cycloalkyl having 3 to 20 carbon atoms, or a vinyl having 1 to 20 carbon atoms, and each $R_2$ independently is an alkyl having 1 to 20 carbon atoms.

The substrate for a blanket according to an embodiment of the present invention can specifically be a porous substrate in terms of improving the thermal insulation properties of a silica aerogel blanket. When a porous substrate for a blanket is used, a silica sol is allowed to easily penetrate into the substrate, and thus, forms an aerogel uniformly inside the substrate for a blanket, so that a silica aerogel blanket prepared can have excellent thermal insulation properties.

The substrate for a blanket which can be used according to an embodiment of the present invention can be a film, a sheet, a net, a fiber, a foam, a non-woven body, or a laminate of two or more layers thereof. Also, according to the use of the substrate for a blanket, surface roughness can be formed or patterned on the surface thereof. More specifically, the substrate for a blanket can be a fiber capable of further improving thermal insulation performance by including a space or a void through which a silica aerogel can be easily inserted into the substrate for a blanket. Furthermore, the substrate for a blanket can preferably have low thermal conductivity.

Specifically, the substrate for a blanket can be polyamide, polybenzimidazole, polyaramid, an acryl resin, a phenol resin, polyester, polyetheretherketone (PEEK), polyolefin (e.g., polyethylene, polypropylene, a copolymer thereof, or the like), cellulose, carbon, cotton, wool, hemp, a non-woven fabric, glass fiber, a ceramic wool, or the like. More specifically, the substrate for a blanket in the present invention can be glass felt.

Also, in the present invention, impregnating a substrate for blanket with the silica sol can be performed in a reaction vessel capable of accommodating the substrate for blanket, and the impregnation can be performed either by pouring a silica sol into the reaction vessel in which the substrate for blanket is accommodated, or by placing a substrate for blanket in a reaction vessel containing a silica sol to be soaked. At this time, in order to improve the bonding of the substrate for a blanket and the silica sol, the substrate for a blanket can be lightly pressed down to be sufficiently impregnated. Also, thereafter, the substrate for a blanket can be pressed at a constant pressure to a predetermined thickness to remove excess silica sol, thereby shortening drying time.

In the production process of a silica aerogel blanket, Steps 1 to 4 are the same as Steps 1 to 4 of the production process of silica aerogel described above, and the step of gelling the silica sol can be performed under the same conditions and by the same method as in the gelation of Step 5 of the silica aerogel described above.

In addition, the method for producing silica aerogel and/or the method for producing a blanket of silica aerogel according to an embodiment of the present invention can further include, after Step 5, (Step 6) aging the silica wet gel, or (Step 7) drying the silica wet gel, or both Step 6 and Step 7.

The aging step can be further performed as a process for allowing a chemical change to be completely achieved by leaving the silica wet gel or the silica wet gel blanket to stand at a suitable temperature, and the aging step can more firmly form the formed network structure, and thus, can enhance the mechanical stability of the silica aerogel or silica aerogel blanket of the present invention.

The aging step of the present invention is performed by adding a solution in which a basic catalyst such as sodium hydroxide (NaOH), potassium hydroxide (KOH), ammonium hydroxide ($NH_4OH$), triethylamine, pyridine, and the like is diluted in an organic solvent at a concentration of 1-10%. Therefore, a Si—O—Si bonding in an aerogel is induced to the maximum to allow the network structure of a silica gel to be firmer, so that there is an effect of facilitating the maintenance of the pore structure in a quick drying process to be performed later. At this time, the organic solvent can be the alcohol (a polar organic solvent) described above, and specifically, can include ethanol.

Also, the aging step should be performed in a suitable temperature range to enhance the optimal pore structure. The aging step of the present invention can be performed by leaving the wet gel blanket composite to stand for 1-10 hours at a temperature of 30 to 70 °C. When the aging temperature is below 30 °C, aging time becomes excessively long, which can cause the total process time to increase, so that there can be problem in that productivity decreases. When the aging temperature is above 70 °C, the temperature is out of the boiling point of ethanol, so that there can be a problem in that the loss of the solvent due to evaporation increases, which can cause raw material cost to increase.

The step of drying a silica wet gel of Step 7 can be performed through a process of removing a solvent while maintaining the pore structure of the aged silica gel, and the drying step can be performed by a supercritical drying process or an atmospheric drying process.

The supercritical drying process can be performed using supercritical carbon dioxide. Carbon dioxide ($CO_2$) is in a gaseous state at room temperature and atmospheric pressure. However, when a temperature and pressure exceed a predetermined temperature and pressure limit called a supercritical point, the evaporation process does not occur so that carbon dioxide becomes to be in a critical state in which gas and liquid cannot be distinguished. Carbon dioxide in a critical state is referred to a supercritical carbon dioxide.

The supercritical carbon dioxide has a molecular density close to that of a liquid, however, has a low viscosity, thereby having properties close to those of gas. Therefore, a supercritical carbon dioxide has a high diffusion rate and a high thermal conductivity so that drying efficiency thereof is high, and drying process time can be shortened.

Specifically, the supercritical drying process performs a solvent substitution process in which an aged silica gel is placed into a supercritical drying reactor, $CO_2$ in a liquid state is filled therein, and an alcohol solvent inside a silica aerogel is substituted with $CO_2$. Thereafter, the temperature is raised to 40-50 °C at a predetermined temperature raising rate, specifically, 0.1 °C/min to 1 °C/min, and the pressure which is greater than or equal to a pressure at which carbon dioxide becomes to be a supercritical state, specifically, the pressure of 100 bar to 150 bar is maintained to allow the carbon dioxide to remain in the supercritical state for a predetermined amount of time, specifically for 20 minutes to 1 hour. In general, carbon dioxide becomes supercritical at a temperature of 31 °C and a pressure of 73.8 bar. After carbon dioxide is maintained at a predetermined temperature and a predetermined pressure to remain in a supercritical state for 2 hours to 12 hours, more specifically, 2 hours to 6 hours, the pressure is generally lowered to complete the supercritical drying process to manufacture an aerogel blanket.

Also, the atmospheric drying process can be performed according to a typical method such as natural drying under a temperature of 70 to 200 °C and an atmospheric pressure (1±0.3 atm).

As a result of the above drying process, a blanket including a porous silica aerogel having nano-sized pores and/or a blanket including a porous silica aerogel can be manufactured. The silica aerogel has excellent physical properties, low tap density and high porosity in particular, together with a high degree of hydrophobicity, and a silica aerogel-containing blanket including the same has excellent mechanical flexibility together with low thermal conductivity.

In addition, before or after the drying process, a compression process to control the thickness and to make the internal structure and surface shape of a blanket uniform, a molding process to have a suitable shape or morphology according to use, or a lamination process for laminating a separate functional layer can be further performed.

Meanwhile, the production method according to an embodiment of the present invention can further include a washing step before the drying. The washing is a step for removing impurities (sodium ions, unreacted substances, by-products, and the like) generated during the reaction and residual ammonia, which can generate an ammonium carbonate salt by reacting with $CO_2$ during supercritical drying, and the like in order to obtain a hydrophobic silica aerogel with high purity, and can be performed by a dilution process or an exchange process using a non-polar organic solvent.

In addition, the method for producing silica aerogel or the method for producing a silica aerogel blanket according to an embodiment of the present invention can further include recycling supercritical waste liquid generated after supercritical drying.

When the drying step is performed by supercritical drying, supercritical waste liquid after the supercritical drying can include water, an alcohol compound, and an organosilane compound included in the catalyst solution. The organosilane compound contained in the catalyst solution added in Step 4 above is partially used for the hydrophobization of silica aerogel and the remaining amount thereof remains in an aging solution and the supercritical waste liquid. The supercritical waste liquid containing the organosilane compound has been typically recycled as a solvent for preparing a silica precursor and a solvent for preparing a silica sol, but when the same is used as a solvent for preparing a silica precursor, the physical properties of produced silica aerogel are degraded due to the organosilane compound and there is a change in gelation time, so that a purification process has been essential for recycling the supercritical waste liquid.

However, since the method for producing silica aerogel and the method for producing a silica aerogel blanket of the present invention do not require an amphiphilic solvent such as an alcohol in a process of preparing the pre-hydrolyzed polysilicate, a separate purification process for using supercritical waste liquid in the process of preparing the pre-hydrolyzed polysilicate is not required, and the supercritical waste liquid can be recycled in a process of preparing the catalyst solution and used for the preparation of a silica sol.

In addition, since the organosilane compound contained in the supercritical waste liquid is also an expensive compound which needs to be reused, a separate supercritical waste liquid purification process for recycling the organosilane compound can be required. However, the method for producing silica aerogel and the method for producing a silica aerogel blanket of the present invention can recycle an organosilane compound of Formula 3 as a hydrophobizing agent in the process of producing a catalyst solution, and thus, does not require a separate purification process for removing the organosilane compound, so that an effect of recycling an organosilane compound without the loss of the organosilane compound due to the purification process can be exerted.

When recycling the supercritical waste liquid, a process of confirming the amount of an organosilane compound to be included in the catalyst solution can be additionally performed, and the organosilane compound can be used in an amount that satisfies a suitable ratio of the organosilane compound compared to the pre-hydrolyzed polysilicate.

Hereinafter, embodiments of the present invention will be described in detail so that those skilled in the art can easily carry out the present invention. However, the present invention can be embodied in many different forms, and is not limited to the embodiments set forth herein.

Example 1

13.841 g of ethyl polysilicate (TE040, ethyl polysilicate with the content of $SiO_2$ of 40%) and 1.220 g of methyltriethoxysilane (MTES) were introduced into a reactor (Si molar ratio of polysilicate and MTES is 9:1). Thereafter, 1.525 g of a HCl aqueous solution having a pH of 1.8 was introduced to the reactor to prepare a reaction mixture. Stirring was performed for one hour at room temperature (20±5 °C), and at the beginning of the reaction, the reactant was opaque, but became transparent due to the generation of ethanol by a hydration reaction of the MTES, and then, partial hydration of ethyl polysilicate proceeded. A pre-hydrolyzed ethyl polysilicate (HTEOS) oligomer in ethanol, which is the final product, was collected.

To 16.589 g of the prepared pre-hydrolyzed ethyl polysilicate (HTEOS) oligomer, 93.992 g of ethanol, 8.998 g of water ($H_2O$), 7.772 g of trimethylsilane, and 0.388 g of NaOH were introduced as a catalyst solution, and gelled to produce a silica wet gel.

The produced silica wet gel was aged by being left to stand in an aging solution of 114.243 g of ethanol and 10.205 g of water at 60 °C for 18 hours.

The silica wet gel was placed in a 7.2 L supercritical extractor and $CO_2$ was injected thereto. Thereafter, the temperature inside the extractor was raised to 60 °C over the course of 1 hour, and supercritical drying was performed at 50 °C and 100 bar. At this time, supercritical waste liquid was recovered through a lower end of a separator.

Example 2

To 16.589 g of the pre-hydrolyzed ethyl polysilicate (HTEOS) oligomer prepared as in the method of Example 1 above, 106.876 g of the waste liquid recovered in Example 1 above was introduced, and after measuring the content of trimethylethoxysilane in the recovered waste liquid using gas chromatography (GC), 3.886 g of trimethylethoxysilane was added to the mixture, and 0.388 g of NaOH was introduced thereto and then gelled to produce a silica wet gel.

The produced silica wet gel was aged by being left to stand in an aging solution of 114.243 g of ethanol and 10.205 g of water at 60 °C for 18 hours.

The silica wet gel was placed in a 7.2 L supercritical extractor and $CO_2$ was injected thereto. Thereafter, the temperature inside the extractor was raised to 60 °C over the course of 1 hour, and supercritical drying was performed at 50 °C and 100 bar. At this time, supercritical waste liquid was recovered through a lower end of a separator.

Example 3

To 16.589 g of the pre-hydrolyzed ethyl polysilicate (HTEOS) oligomer prepared as in the method of Example 1 above, 106.876 g of the waste liquid recovered in Example 2 above was introduced, and after measuring the content of trimethylethoxysilane in the recovered waste liquid, 3.886 g of trimethylethoxysilane was added to the mixture, and 0.388 g of NaOH was introduced thereto and then gelled to produce a silica wet gel.

The produced silica wet gel was aged by being left to stand in an aging solution of 114.243 g of ethanol and 10.205 g of water at 60 °C for 18 hours.

The silica wet gel was placed in a 7.2 L supercritical extractor and $CO_2$ was injected thereto. Thereafter, the temperature inside the extractor was raised to 60 °C over the course of 1 hour, and supercritical drying was performed at 50 °C and 100 bar. At this time, supercritical waste liquid was recovered through a lower end of a separator.

Example 4

13.182 g of ethyl polysilicate (TE040, ethyl polysilicate with the content of $SiO_2$ of 40%) and 1.743 g of methyltriethoxysilane (MTES) were introduced into a reactor (Si molar ratio of polysilicate and MTES is 6:1). Thereafter, 1.543 g of a HCl aqueous solution having a pH of 1.8 was introduced to the reactor to prepare a reaction mixture. Stirring was performed for one hour at room temperature (20±5 °C), and at the beginning of the reaction, the reactant was opaque, but became transparent due to the generation of ethanol by a hydration reaction of the MTES, and then, partial hydration of ethyl polysilicate proceeded. A pre-hydrolyzed ethyl polysilicate (HTEOS) oligomer in ethanol, which is the final product, was collected.

To 16.469 g of the prepared pre-hydrolyzed ethyl polysilicate (HTEOS) oligomer, 93.931 g of ethanol, 8.998 g of water ($H_2O$), 7.772 g of trimethylsilane, and 0.388 g of NaOH were introduced as a catalyst solution, and gelled to produce a silica wet gel.

Thereafter, aerogel was prepared through the same aging process and supercritical drying as in Example 1.

Example 5

13.671 g of ethyl polysilicate (TE040, ethyl polysilicate with the content of $SiO_2$ of 40%) and 1.356 g of methyltriethoxysilane (MTES) were introduced into a reactor (Si molar ratio of polysilicate and MTES is 8:1). Thereafter, 1.531 g of a HCl aqueous solution having a pH of 1.8 was introduced to the reactor to prepare a reaction mixture. Stirring was performed for one hour at room temperature (20±5 °C), and at the beginning of the reaction, the reactant was opaque, but became transparent due to the generation of ethanol by a hydration reaction of the MTES, and then, partial hydration of ethyl polysilicate proceeded. A pre-hydrolyzed ethyl polysilicate (HTEOS) oligomer in ethanol, which is the final product, was collected.

To 16.558 g of the prepared pre-hydrolyzed ethyl polysilicate (HTEOS) oligomer, 93.977 g of ethanol, 8.998 g of water ($H_2O$), 7.772 g of trimethylsilane, and 0.388 g of NaOH were introduced as a catalyst solution, and gelled to produce a silica wet gel.

Thereafter, aerogel was prepared through the same aging process and supercritical drying as in Example 1.

Example 6

13.981 g of ethyl polysilicate (TE040, ethyl polysilicate with the content of $SiO_2$ of 40%) and 1.109 g of methyltriethoxysilane (MTES) were introduced into a reactor (Si molar ratio of polysilicate and MTES is 10:1). Thereafter, 1.524 g of a HCl aqueous solution having a pH of 1.8 was introduced to the reactor to prepare a reaction mixture. Stirring was performed for one hour at room temperature (20±5 °C), and at the beginning of the reaction, the reactant was opaque, but became transparent due to the generation of ethanol by a hydration reaction of the MTES, and then, partial hydration of ethyl polysilicate proceeded. A pre-hydrolyzed ethyl polysilicate (HTEOS) oligomer in ethanol, which is the final product, was collected.

To 16.614 g of the prepared pre-hydrolyzed ethyl polysilicate (HTEOS) oligomer, 94.007 g of ethanol, 8.998 g of water ($H_2O$), 7.772 g of trimethylsilane, and 0.388 g of NaOH were introduced as a catalyst solution, and gelled to produce a silica wet gel.

Thereafter, aerogel was prepared through the same aging process and supercritical drying as in Example 1.

Example 7

14.196 g of ethyl polysilicate (TE040, ethyl polysilicate with the content of $SiO_2$ of 40%) and 0.939 g of methyltriethoxysilane (MTES) were introduced into a reactor (Si molar ratio of polysilicate and MTES is 12:1). Thereafter, 1.519 g of a HCl aqueous solution having a pH of 1.8 was introduced to the reactor to prepare a reaction mixture. Stirring was performed for one hour at room temperature (20±5 °C), and at the beginning of the reaction, the reactant was opaque, but became transparent due to the generation of ethanol by a hydration reaction of the MTES, and then, partial hydration of ethyl polysilicate proceeded. A pre-hydrolyzed ethyl polysilicate (HTEOS) oligomer in ethanol, which is the final product, was collected.

To 16.654 g of the prepared pre-hydrolyzed ethyl polysilicate (HTEOS) oligomer, 94.027 g of ethanol, 8.997 g of water ($H_2O$), 7.772 g of trimethylsilane, and 0.388 g of NaOH were introduced as a catalyst solution, and gelled to produce a silica wet gel.

Thereafter, aerogel was prepared through the same aging process and supercritical drying as in Example 1.

Example 8

12.816 g of ethyl polysilicate (TE040, ethyl polysilicate with the content of $SiO_2$ of 40%) and 2.034 g of methyltriethoxysilane (MTES) were introduced into a reactor (Si molar ratio of polysilicate and MTES is 5:1). Thereafter, 1.552 g of a HCl aqueous solution having a pH of 1.8 was introduced to the reactor to prepare a reaction mixture. Stirring was performed for one hour at room temperature (20±5 °C), and at the beginning of the reaction, the reactant was opaque, but became transparent due to the generation of ethanol by a hydration reaction of the MTES, and then, partial hydration of ethyl polysilicate proceeded. A pre-hydrolyzed ethyl polysilicate (HTEOS) oligomer in ethanol, which is the final product, was collected.

To 16.402 g of the prepared pre-hydrolyzed ethyl polysilicate (HTEOS) oligomer, 93.897 g of ethanol, 8.998 g of water ($H_2O$), 7.772 g of trimethylsilane, and 0.388 g of NaOH were introduced as a catalyst solution, and gelled to produce a silica wet gel.

Thereafter, aerogel was prepared through the same aging process and supercritical drying as in Example 1.

Example 9

13.841 g of ethyl polysilicate (TE040, ethyl polysilicate with the content of $SiO_2$ of 40%) and 2.129 g of propyltrimethoxysilane (PTES) were introduced into a reactor (Si molar ratio of polysilicate and PTES is 9:1). Thereafter, 1.527 g of a HCl aqueous solution having a pH of 1.8 was introduced to the reactor to prepare a reaction mixture. Stirring was performed for one hour at room temperature (20±5 °C), and at the beginning of the reaction, the reactant was opaque, but became transparent due to the generation of ethanol by a hydration reaction of the MTES, and then, partial hydration of ethyl polysilicate proceeded. A pre-hydrolyzed ethyl polysilicate (HTEOS) oligomer in ethanol, which is the final product, was collected.

To 17.498 g of the prepared pre-hydrolyzed ethyl polysilicate (HTEOS) oligomer, 93.046 g of ethanol, 8.998 g of water ($H_2O$), 7.772 g of trimethylsilane, and 0.388 g of NaOH were introduced as a catalyst solution, and gelled to produce a silica wet gel.

Thereafter, aerogel was prepared through the same aging process and supercritical drying as in Example 1.

Comparative Example 1

15.497 g of ethyl polysilicate (TEOS40) and 13.858 g of ethanol were introduced into a reactor. Thereafter, 1.491 g of a HCl aqueous solution having a pH of 1.8 was introduced to the reactor to prepare a reaction mixture. The amount of the ethanol was determined to be the minimum amount at which the ethyl polysilicate and the HCl aqueous solution would be transparently mixed. Stirring was performed for one hour at room temperature (20±5 °C), and a pre-hydrolyzed ethyl polysilicate (HTEOS) oligomer in ethanol, which is the final product, was collected.

To 30.846 g of the prepared pre-hydrolyzed ethyl polysilicate (HTEOS) oligomer, 89.029 g of ethanol, 7.949 g of water ($H_2O$), 7.772 g of trimethylsilane, and 0.388 g of NaOH were introduced as a catalyst solution, and gelled to produce a silica wet gel.

The produced silica wet gel was aged by being left to stand in an aging solution of 114.243 g of ethanol and 10.205 g of water at 60 °C for 18 hours.

The silica wet gel was placed in a 7.2 L supercritical extractor and $CO_2$ was injected thereto. Thereafter, the temperature inside the extractor was raised to 60 °C over the course of 1 hour, and supercritical drying was performed at 50 °C and 100 bar. At this time, supercritical waste liquid was recovered through a lower end of a separator.

Comparative Example 2

After fractional distillation of the supercritical waste liquid recovered in Comparative Example 1 above, 13.858 g of ethanol was introduced instead in the preparation of the pre-hydrolyzed ethyl polysilicate (HTEOS) oligomer of Comparative Example 1 above, and then a pre-hydrolyzed ethyl polysilicate (HTEOS) oligomer in ethanol was prepared.

To 30.846 g of the prepared pre-hydrolyzed ethyl polysilicate (HTEOS) oligomer, 100.864 g of the waste liquid recovered in Example 1 above was introduced, and after measuring the content of trimethylethoxysilane in the recovered waste liquid, 3.886 g of trimethylethoxysilane was added to the mixture, and 0.388 g of NaOH was introduced thereto and then gelled to produce a silica wet gel.

The produced silica wet gel was aged by being left to stand in an aging solution of 114.243 g of ethanol and 10.205 g of water at 60 °C for 18 hours.

The silica wet gel was placed in a 7.2 L supercritical extractor and $CO_2$ was injected thereto. Thereafter, the temperature inside the extractor was raised to 60 °C over the course of 1 hour, and supercritical drying was performed at 50 °C and 100 bar. At this time, supercritical waste liquid was recovered through a lower end of a separator.

Comparative Example 3

After fractional distillation of the supercritical waste liquid recovered in Comparative Example 2 above, 13.858 g of ethanol was introduced instead in the preparation of the pre-hydrolyzed ethyl polysilicate (HTEOS) oligomer of Comparative Example 1 above, and then a pre-hydrolyzed ethyl polysilicate (HTEOS) oligomer in ethanol was prepared.

To 30.846 g of the prepared pre-hydrolyzed ethyl polysilicate (HTEOS) oligomer, 100.864 g of the waste liquid recovered in Example 2 above was introduced, and after measuring the content of trimethylethoxysilane in the recovered waste liquid, 3.886 g of trimethylethoxysilane was added to the mixture, and 0.388 g of NaOH was introduced thereto and then gelled to produce a silica wet gel.

The produced silica wet gel was aged by being left to stand in an aging solution of 114.243 g of ethanol and 10.205 g of water at 60 °C for 18 hours.

The silica wet gel was placed in a 7.2 L supercritical extractor and $CO_2$ was injected thereto. Thereafter, the temperature inside the extractor was raised to 60 °C over the course of 1 hour, and supercritical drying was performed at 50 °C and 100 bar. At this time, supercritical waste liquid was recovered through a lower end of a separator.

Experimental Examples: Measurement of Physical Properties of Aerogel

1) Measurement of Thermal Conductivity

The room temperature (about 23 °C) thermal conductivity of the silica aerogel produced in each of Examples and Comparative Examples was measured using the HFM 436 equipment of NETZSCH Co., Ltd, and the results are shown in Table 1.

2) Measurement of Absorption Rate

A specimen (thickness of 10 mm) having a size of 100 mm×100 mm was floated on distilled water of 21±2 °C, and a mesh screen was placed on the specimen to sink the specimen to 127 mm below the surface of the water. 15 minutes later, the screen was removed, and when the specimen rose to the surface, the specimen was picked up with a clamp and was hung vertically for 60±5 seconds. Thereafter, the weight before and after the impregnation were each measured to determine a weight increase rate so as to calculate an absorption rate.

TABLE 1

| Classifications | | Thermal conductivity (mW/mK) | Absorption rate (wt %) |
|---|---|---|---|
| Examples | 1 | 18.25 | 3.18 |
| | 2 | 18.52 | 2.85 |
| | 3 | 18.44 | 3.01 |
| Comparative Examples | 1 | 18.12 | 3.32 |
| | 2 | 18.82 | 2.91 |
| | 3 | 18.59 | 2.89 |

Through Examples 1 to 9, it was confirmed that ethanol was effectively generated through a hydration reaction of methyltriethoxysilane (MTES) or triethoxy(propyl)silane, a compound represented by Formula 1, without the addition of a separate ethanol solvent, thereby allowing a hydration reaction of an ethyl polysilicate to occur, and it was possible to produce aerogel using the prepared pre-hydrolyzed ethyl polysilicate (HTEOS) oligomer.

Examples 2 and 3 are examples of using the supercritical waste liquid respectively recovered in Examples 1 and 2 in a production process of a silica gel without a separate purification treatment therefor, and the results of Examples 2 and 3 confirm that even when the supercritical waste liquid generated in Examples 1 and 2 according to the present invention is used in the production process of the silica gel without a separate purification treatment, the physical properties of the produced silica aerogel are not degraded, so that the supercritical waste liquid can be effectively recycled without a separate purification process for the supercritical waste liquid.

The silica aerogel of each of Examples 1 to 3, 5 to 7, and 9 showed an equivalent level of thermal conductivity and absorption rate when compared to those of the silica aerogel of each of Comparative Examples 1 to 3, and the silica aerogel of each of Examples 4 and 8 showed an equivalent level of absorption rate when compared to that of the silica aerogel of each of Comparative Examples 1 to 3.

Through the above, it has been confirmed that Examples 1 to 9 can effectively prepare a pre-hydrolyzed polysilicate without the addition of separate ethanol during a hydration reaction of an ethyl polysilicate, and that silica aerogel can be produced using the pre-hydrolyzed polysilicate.

The foregoing description of the present invention has been presented for purposes of illustration. It will be understood by those skilled in the art that various changes in form and details can be made therein without departing from the spirit and scope of the invention. It is therefore to be understood that the above-described embodiments are illustrative in all aspects and not restrictive.

The invention claimed is:

1. A method for producing silica aerogel, comprising:

introducing a polysilicate and a compound of Formula 1 below into a reactor (Step 1);

introducing an acidic aqueous solution into the reactor to prepare a reaction mixture (Step 2);

stirring the reaction mixture to perform a hydration reaction, thereby preparing a pre-hydrolyzed polysilicate (Step 3);

adding a catalyst solution to the pre-hydrolyzed polysilicate, followed by mixing to prepare a silica sol (Step 4);

gelling the silica sol to form a silica wet gel (Step 5);

drying the silica wet gel (Step 7), wherein the drying is performed by supercritical drying; and after the supercritical drying, recycling waste liquid to preparing the catalyst solution used in Step 4 without a separate purification process:

$$R_1—Si—(OR_2)_3 \quad \text{[Formula 1]}$$

wherein $R_1$ is an alkyl having 1 to 20 carbon atoms, a cycloalkyl having 3 to 20 carbon atoms, or a vinyl group, and each $R_2$ is independently an alkyl having 1 to 20 carbon atoms.

2. The method of claim 1, which further comprises aging the silica wet gel (Step 6), after Step 5.

3. The method of claim 1, wherein the catalyst solution comprises water, an alcohol compound, a basic catalyst, and an organosilane compound.

4. The method of claim 1, wherein the compound of Formula 1 is hydrated to form an alcohol compound of Formula 2 below and a silanol compound of Formula 3 below:

$$R_2—OH \quad \text{[Formula 2]}$$

$$R_1—Si—(OH)_3 \quad \text{[Formula 3]}$$

wherein $R_1$ is an alkyl having 1 to 20 carbon atoms, a cycloalkyl having 3 to 20 carbon atoms, or a vinyl group, and $R_2$ is an alkyl having 1 to 20 carbon atoms.

5. The method of claim 1, wherein the hydration reaction of Step 3 is achieved in the presence of an alcohol compound of Formula 2 formed by hydration of a compound of Formula 1:

$$R_2—OH \quad \text{[Formula 2]}$$

wherein $R_2$ is an alkyl having 1 to 20 carbon atoms.

6. The method of claim 1, wherein a molar ratio of the polysilicate to the compound of Formula 1 is 5:1 to 15:1.

7. The method of claim 1, wherein the acidic aqueous solution comprises an acid catalyst in an amount of 0.005 to 0.20 parts by weight based on 100 parts by weight of the polysilicate.

8. The method of claim 1, wherein preparing the pre-hydrolyzed polysilicate excludes the addition of a separate alcohol-based solvent in addition to the polysilicate and the compound of Formula 1 into the reactor.

9. The method of claim 1, wherein the polysilicate comprises one or more selected from the group consisting of methyl polysilicate, ethyl polysilicate, propyl polysilicate, isopropyl polysilicate, butyl polysilicate, secondary butyl polysilicate, tertiary butyl polysilicate, hexyl polysilicate, cyclohexyl polysilicate, and dodecyl polysilicate.

10. The method of claim 1, wherein the compound of Formula 1 comprises one or more selected from the group consisting of alkyltriethoxysilane and alkyltrimethoxysilane.

11. The method of claim 1, wherein the compound of Formula 1 is methyltriethoxysilane.

12. The method of claim 1, wherein the compound of Formula 1 is an alkyltriethoxysilane, and the alkyltriethoxysilane is hydrated to form an alkylsilanol and ethanol, and the hydration of the polysilicate in Step 3 is performed in the presence of the ethanol formed by the hydration of the alkyltriethoxysilane.

13. A method for producing a silica aerogel blanket, the method comprising:

introducing a polysilicate and a compound of Formula 1 below into a reactor;

introducing an acidic aqueous solution into the reactor to prepare a reaction mixture (Step 2);

stirring the reaction mixture to perform a hydration reaction, thereby preparing a pre-hydrolyzed polysilicate (Step 3);

adding a catalyst solution to the pre-hydrolyzed polysilicate, followed by mixing to prepare a silica sol (Step 4); and impregnating a substrate for a blanket with the silica sol and then gelling the silica sol to form a silica wet gel blanket (Step 5);

drying the silica wet gel blanket (Step 7), wherein the drying is performed by supercritical drying; and after the supercritical drying, recycling waste liquid to prepare the catalyst solution used in Step 4 without a separate purification process:

$$R_1—Si—(OR_2)_3 \quad \text{[Formula 1]}$$

wherein $R_1$ is an alkyl having 1 to 20 carbon atoms, a cycloalkyl having 3 to 20 carbon atoms, or a vinyl group, and each $R_2$ is independently an alkyl having 1 to 20 carbon atoms.

14. A method for producing silica aerogel, comprising:

introducing a polysilicate and a compound of Formula 1 below into a reactor, wherein a molar ratio of the polysilicate to the compound of Formula 1 is 5:1 to 15:1 (Step 1);

introducing an acidic aqueous solution into the reactor to prepare a reaction mixture (Step 2);

stirring the reaction mixture to perform a hydration reaction, thereby preparing a pre-hydrolyzed polysilicate (Step 3);

adding a catalyst solution to the pre-hydrolyzed polysilicate, followed by mixing to prepare a silica sol (Step 4); and gelling the silica sol to form a silica wet gel (Step 5):

$$R_1—Si—(OR_2)_3 \quad \text{[Formula 1]}$$

wherein $R_1$ is an alkyl having 1 to 20 carbon atoms, a cycloalkyl having 3 to 20 carbon atoms, or a vinyl group, and each $R_2$ is independently an alkyl having 1 to 20 carbon atoms.

* * * * *